United States Patent
Sender Beleta et al.

(10) Patent No.: US 10,870,282 B2
(45) Date of Patent: Dec. 22, 2020

(54) PRINT PATTERN AND ALGORITHM FOR AUTOMATIC INK MIX DETECTION

(71) Applicant: Hewlett-Packard Development Company, L.P., Spring, TX (US)

(72) Inventors: Jordi Sender Beleta, Sant Cugat del Valles (ES); Peter Norovic, Sant Cugat del Valles (ES); Jan Morovic, London (GB); Hector Gomez Minano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/336,153

(22) PCT Filed: Sep. 27, 2016

(86) PCT No.: PCT/US2016/053962
§ 371 (c)(1),
(2) Date: Mar. 25, 2019

(87) PCT Pub. No.: WO2018/063158
PCT Pub. Date: Apr. 5, 2018

(65) Prior Publication Data
US 2019/0210372 A1    Jul. 11, 2019

(51) Int. Cl.
*B41J 2/175* (2006.01)
*B41J 2/135* (2006.01)
*B41J 2/195* (2006.01)
*G01J 3/52* (2006.01)
*G01J 3/50* (2006.01)

(52) U.S. Cl.
CPC ............... *B41J 2/175* (2013.01); *B41J 2/135* (2013.01); *B41J 2/195* (2013.01); *G01J 3/50* (2013.01); *G01J 3/501* (2013.01); *G01J 3/52* (2013.01)

(58) Field of Classification Search
CPC ............ B41J 2/175; B41J 2/135; B41J 2/195
See application file for complete search history.

(56) References Cited

U.S. PATENT DOCUMENTS

| | | | |
|---|---|---|---|
| 6,196,652 B1 | 3/2001 | Subirada et al. | |
| 6,238,112 B1 | 5/2001 | Girones et al. | |
| 6,244,687 B1 | 6/2001 | Gast et al. | |
| 6,883,892 B2 * | 4/2005 | Sievert | B41J 29/393 347/19 |

(Continued)

FOREIGN PATENT DOCUMENTS

| | | |
|---|---|---|
| EP | 0539868 A2 | 5/1993 |
| JP | 2011071661 A | 4/2011 |
| WO | WO-2009014537 A1 | 1/2009 |

*Primary Examiner* — Jason S Uhlenhake
(74) *Attorney, Agent, or Firm* — HP Inc. Patent Department

(57) ABSTRACT

A method of detecting printing fluid mixing is provided. A test pattern for at least one printing fluid is printed with a printing device. The test pattern for the at least one printing fluid is scanned with a scanning device. Colorimetric data of the test pattern for the at least one printing fluid are obtained. Metric values are determined from the colorimetric data. A statistical analysis is performed on the determined metric values. Based on the statistical analysis, it is determined whether printing fluid mixing has occurred and where printing fluid mixing has occurred.

16 Claims, 11 Drawing Sheets

(56) References Cited

U.S. PATENT DOCUMENTS

| | | | |
|---|---|---|---|
| 7,319,547 B2 | 1/2008 | Piatt et al. | |
| 7,431,417 B2 | 10/2008 | Rodenas et al. | |
| 8,933,978 B1 * | 1/2015 | Fowell | B41J 13/0009 |
| | | | 347/171 |
| 9,079,417 B1 | 7/2015 | Yasukawa | |
| 2005/0219293 A1 * | 10/2005 | Kachi | B41J 11/002 |
| | | | 347/14 |
| 2015/0062208 A1 | 3/2015 | Yasukawa | |

* cited by examiner

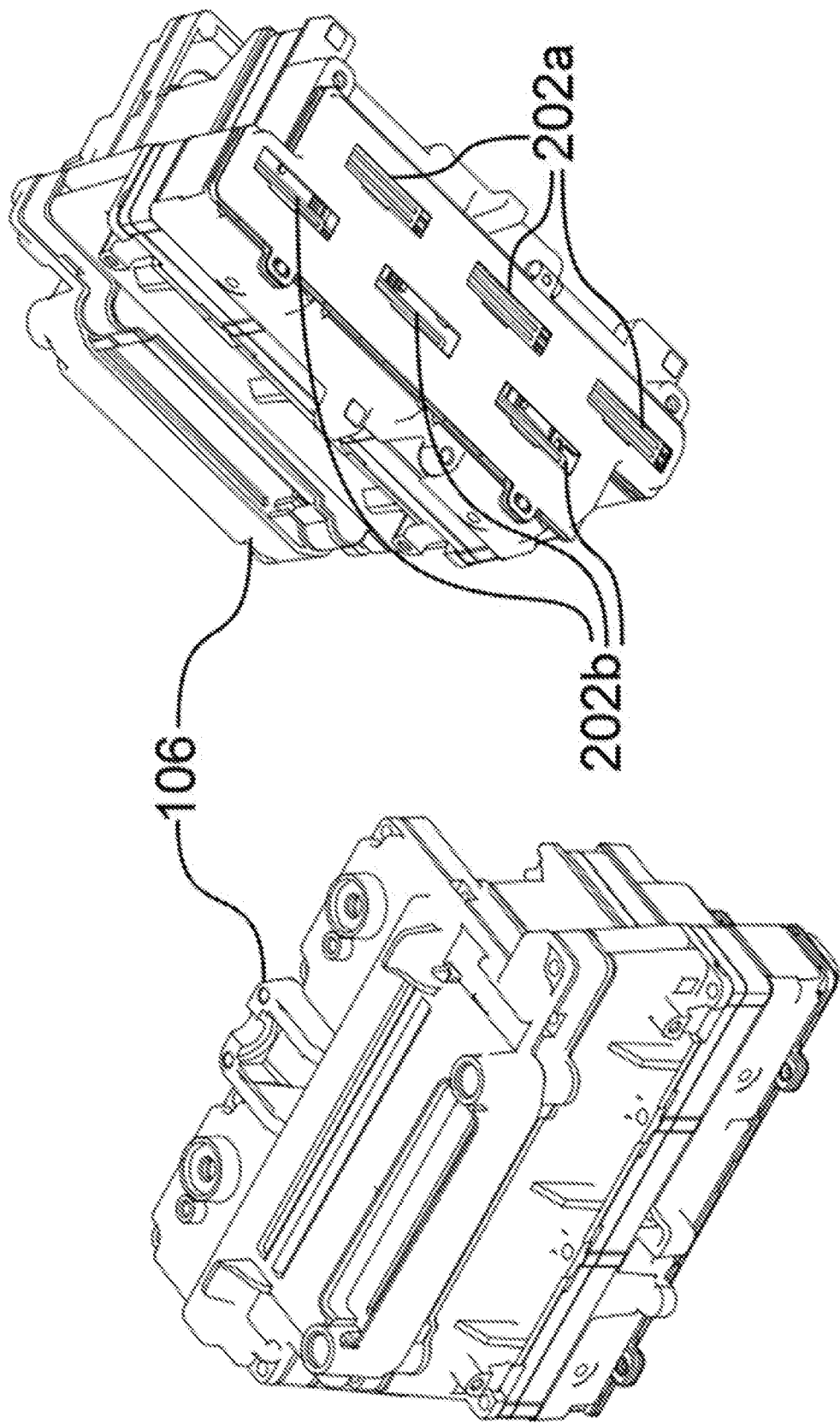

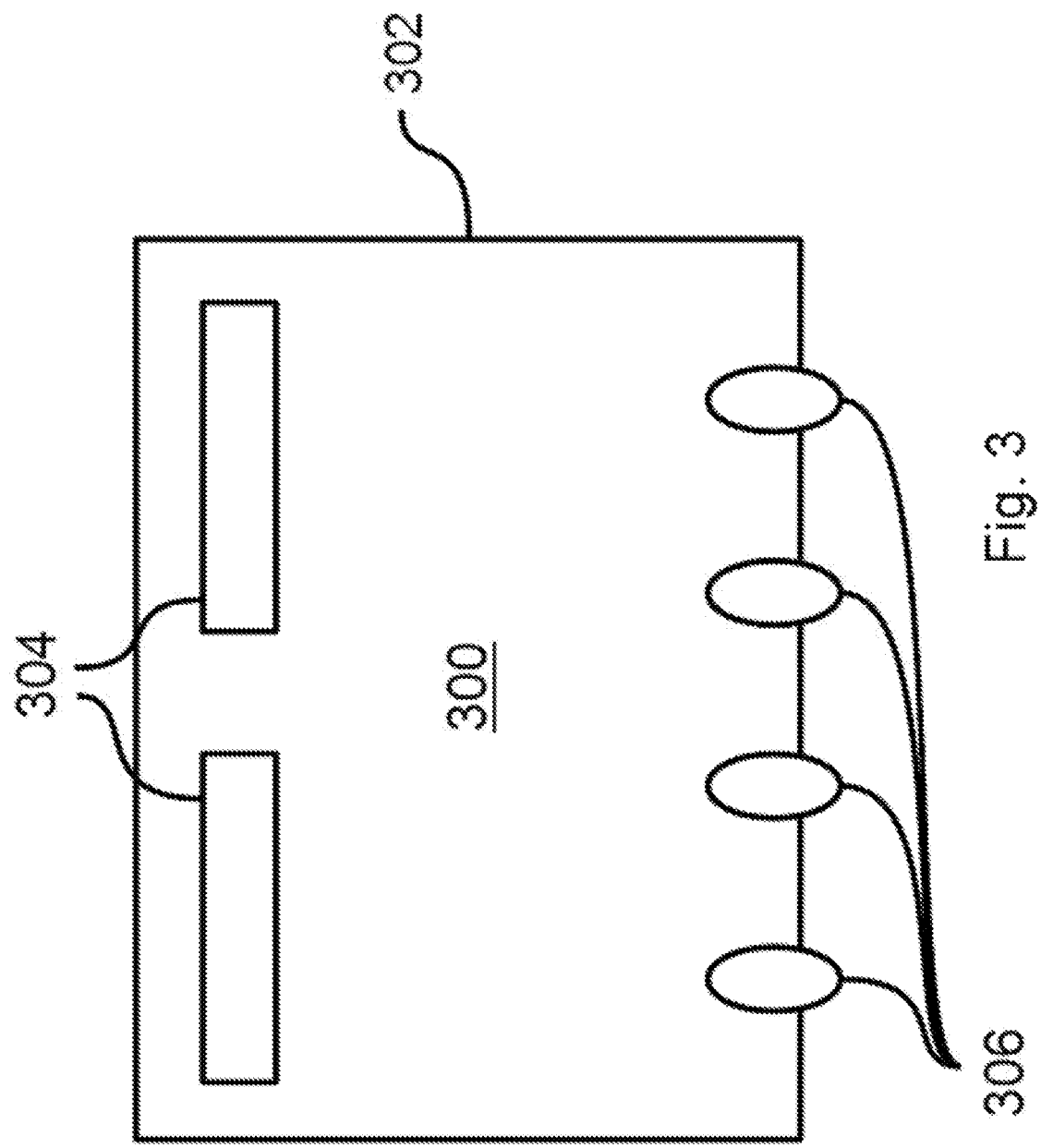

PRINT PATTERN AND ALGORITHM FOR AUTOMATIC INK MIX DETECTION

BACKGROUND

Printing fluid mixing may occur when multiple printing fluids are used in a printing device, such as an inkjet printer, for example a multicolor inkjet printer. Printing fluid mixing detection may be implemented in these printing devices.

BRIEF DESCRIPTION OF THE DRAWINGS

Examples will be described, by way of example only, with reference to the accompanying drawings in which corresponding reference numerals indicate corresponding parts and in which:

FIG. 2a illustrates an example printhead in two different views, according to an example;

FIG. 3 is a schematic view of a scanning device, according to an example;

DETAILED DESCRIPTION

In general, printing devices using printing fluids, such as inkjet printers, may comprise one or more printheads, which are used to deposit printing fluid on print media, such as paper, cardboard, plastic or textile, etc. Each printhead may comprise one or more dies, each having at least one array of nozzles. In some examples, the printing device may be a page wide array printer having a print element, such as a printhead or a printbar comprising an array of printheads. In some examples, the dies may be arranged in a number of rows or columns. In some examples, the printing device may be a multicolor printing device. Each row of dies may then be dedicated to deposit printing fluid of a particular color onto the print medium.

When multiple printing fluids, e. g. corresponding to different primary colors, are used in a printing device, the printing fluids of the different colors may unintentionally mix. Such printing fluid mixing may occur internally, e.g. when components which segregate the different printing fluids contained within the printhead from one another become compromised, or externally, e.g. when different printing fluids ejected from the nozzles mix on the outer surface of the printhead.

Figure 1:
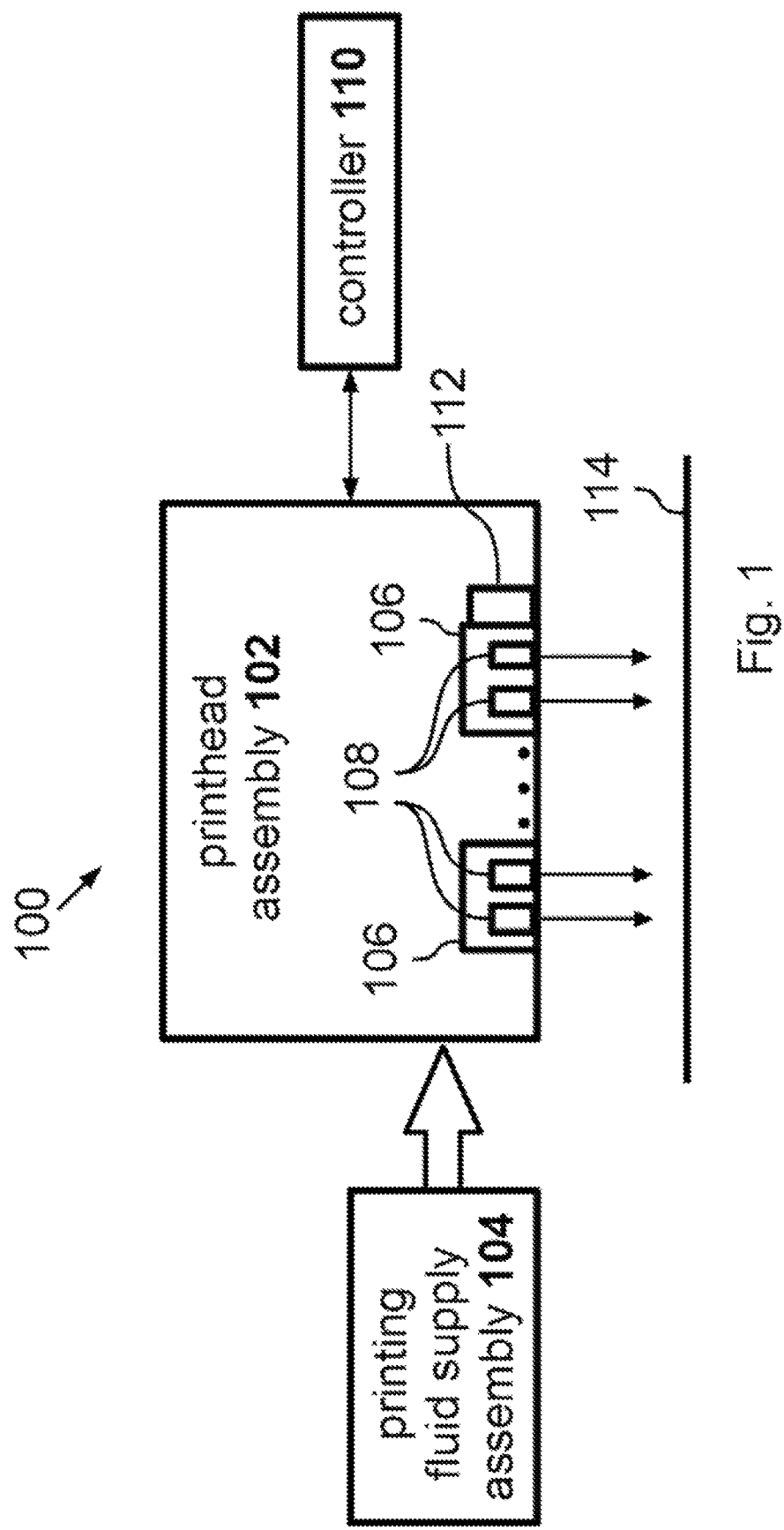
FIG. 1 illustrates an example of a printing system suitable for implementing an example method of printing fluid mixing detection according to an example.

FIG. 1 illustrates an example of a printing device 100 suitable for implementing an example method of printing fluid mixing detection according to an embodiment of the disclosure. A printing device refers generally to devices which can produce printed output, including but not limited to, for example, a printer, a photocopier, a fax machine, etc. Printing device 100 may include a printhead assembly 102, a printing fluid supply assembly 104, and a controller 110. The various electrical components of printing device 100 may be connected with at least one power supply (not shown) that provides power thereto.

Printhead assembly 102 includes at least one printhead 106, which deposits printing fluid, for example liquid ink, through a plurality of orifices or nozzles 108 toward a print medium 114. Nozzles 108 may be arranged in one or more columns or arrays such that properly sequenced deposition of printing fluid from nozzles 108 may cause an image or images to be printed on the print medium 114 by the printhead 106 as printhead assembly 102 and print media 114 are moved relative to each, other. Images refers to any kind of depiction of signs, characters, symbols, numbers, letters, text and/or graphics which may be applied to the print medium. Printing fluid supply assembly 104 may supply printing fluid to printhead assembly 102 from a printing fluid reservoir (not shown).

In some examples, printing fluid supply assembly 104 may supply a number of different printing fluids to printhead assembly 102. In some examples, the number of different printing fluids may correspond to a number of different primary colors. In some examples, there may be four different printing fluids corresponding to four different primary colors. In some other examples, the number of different printing fluids corresponding to a number of primary colors may be less than four, e. g. three or two. In some other examples, the number of different printing fluids corresponding to a number of primary colors may be more than four, e. g. six or eight.

In some examples, controller 110 may include components of a standard computing system, such as a processor, memory, firmware, software, and other electronics for controlling the general functions of printing device 100 and for communicating with and controlling system components such as printhead assembly 102. In some examples, controller 110 may be in communication with printing device 100 along an electronic, infrared, optical, or other information transfer path.

In some examples, controller 110 may control printhead assembly 102 to deposit printing fluid through nozzles 108 to print medium 114. Thus, controller 110 may define a pattern of deposited printing fluid which may form, for example characters, symbols, and/or other graphics or images on print media 114.

In some examples, printing device 100 may be an inkjet printer comprising at least one printhead 106. In some examples, one or more printheads 106 may be mounted on a single carrier (not shown), which enables the printheads to move back and forth along a print zone along an axis that spans the print medium 114 or otherwise spans a printing width. In some examples, a plurality of printheads 106 may be mounted on a carrier, where such examples may be referred to as wide-array inkjet printing systems. In such examples, printheads 106 may have the capability of printing multiple columns of the same color or multiple columns of different colors simultaneously.

In some other examples, printing device 100 may be a page wide array printer. A page-wide array printer may comprise a print element, such as a printhead 106 or a printbar comprising an array of print heads 106, extending the printing width, e. g. the entire width of the print medium 114. Such an arrangement allows the entire width of a print medium 114 to be printed simultaneously. In some examples, the print element may be fixed within the printing device. During a printing process, the print medium 114 may be advanced past the print element along a printing direction through a print zone where an image or images are printed on the print medium by the print element.

In some examples, printing device 100 may comprise a scanning device 112. In some examples, scanning device 112 may be any kind of sensor which is able to provide colorimetric data. For example, scanning device 112 may comprise, e. g. a spectrophotometer, a colorimeter, a scanner, a densitometer, etc. In some examples, scanning device 112 may comprise a camera, e. g. a CCD camera. In sore examples, scanning device 112 may comprise one or more photodetectors.

The scanning device 112 may be positioned within the printing device 100. For example, scanning device 112 may be positioned at a location at which it can readily obtain colorimetric data or intensity information. In some examples, scanning device 112 may be arranged adjacent to a printhead 106. In some examples, scanning device 112 may be an integral part of printhead 106. In some other examples, scanning device 112 may be a separate component. In some examples, scanning device 112 may be arranged in the printhead carrier (not shown) which enables the printheads to move back and forth along the print zone. In some examples, scanning device 112 may be arranged such that it can move back and forth along the print zone. In some other examples, scanning device 112 may be fixed within printing device 100.

FIG. 2a illustrates an example printhead 106 in two different views, a top view (left) and a bottom view (right). In some examples, the printhead 106 may comprise a plurality of dies 202a, 202b. For example, the printhead 106 comprises six dies 202a, 202b. In some examples, the number of dies 202a, 202b may be fewer, such as two or four dies 202a, 202b, or greater than six, such as eight or ten dies 202a, 202b. The dies 202a, 202b may be precision-aligned and placed on a dimensionally stable substrate. In some examples, the substrate may provide, for example mechanical alignment, printing fluid supply channels and electrical interconnection (not shown).

In some examples, the dies 202a, 202b may be arranged in two rows, a row of even dies 202a and a row of odd dies 202b at the bottom of the printhead 106. Each die 202a, 202b may comprise at least one array of nozzles (not shown). In some examples, each die 202a, 202b comprises one array of nozzles for each primary color. For example, each die 202a, 202b may comprise four arrays of nozzles for each of four primary colors to be printed.

Figure 2B:
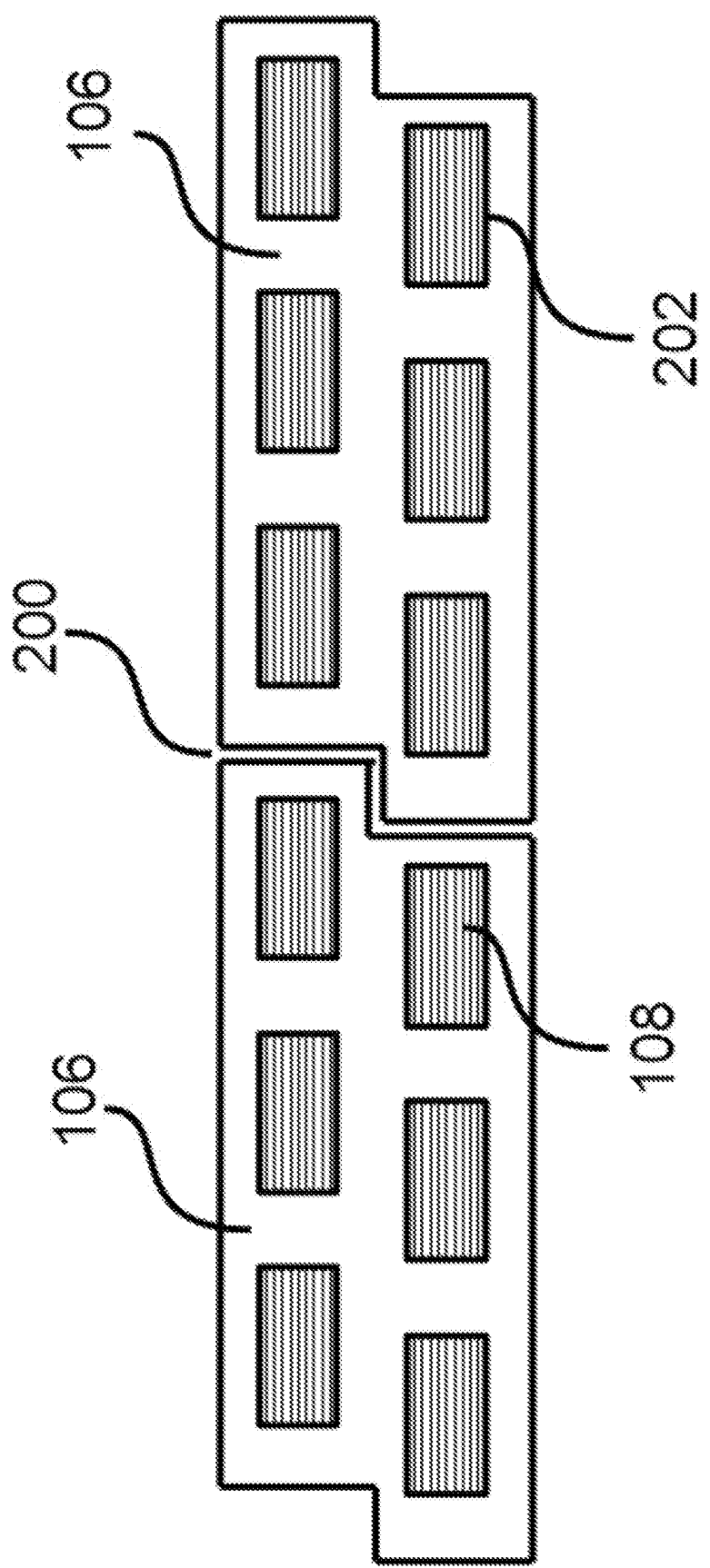
FIG. 2b schematically illustrates an example printbar, according to an example.

FIG. 2b illustrates an example printbar 200 comprising an array of printheads 106. In some examples, printbar 200 may comprise an array of two printheads 106. In some examples, the number of printheads may be larger than two, for example, printbar 200 may comprise three, four or six printheads 106. In some examples, the printheads 106 may be aligned on the printbar 200 in one row. In some other examples, the printheads 106 may be aligned on the printbar 200 in a number of rows, e. g. in two rows.

Each printhead 106 on the printbar 200 comprises a number of dies 202. For example, each printhead may comprise six dies. In some examples, the number of dies may be larger than six, e. g. eight dies. In some examples, the number of dies may be fewer than six, e. g. four dies. In some examples, some printheads 106 on the printbar 200 may comprise a number of dies, e.g. six dies, and other printheads 106 on the printbar 200 may comprise a different number of dies, e. g. four dies. In some examples, the dies 202 may be arranged in a number of rows, e. g. two rows.

In some examples, each die 202 comprises one array of nozzles 108 for each primary color. For example, each die 202 may comprise four arrays of nozzles for each of four primary colors to be printed. In some examples, the number of arrays of nozzles 108 for each primary color may be larger than one, e. g. two array of nozzles 108.

In some examples, the printheads 106 on the printbar 200 may span a printing width, e. g. a print region, a print media width, or the like. In some examples, the printheads 106 on the printbar 200 overlap to effectively deposit printing fluid across the printing width without gaps on the print medium 114.

Figure 2C:
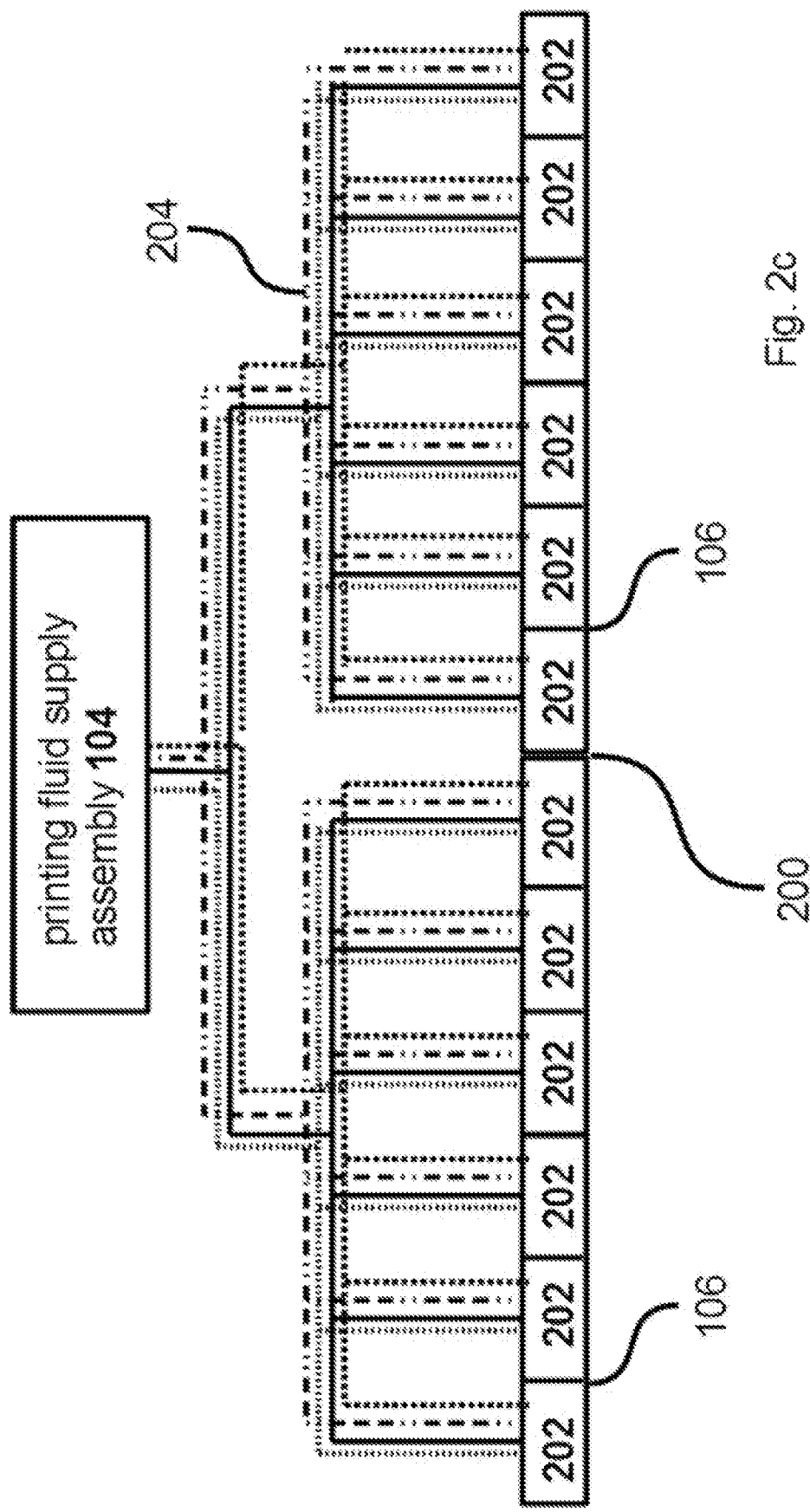
FIG. 2c schematically illustrates an example printer and its corresponding supply with multiple printing fluids, according to an example.

FIG. 2c illustrates an example of how the dies 202 of one or more printheads 106, e. g. of the array of printheads 106 on a printbar 200, are supplied with multiple printing fluids by the printing fluid supply assembly 104. In some examples, printing fluid supply assembly 104 may supply printing fluid to printhead assembly 102 or to the array of printheads 106 on printbar 200 from a printing fluid reservoir (not shown) through an interface connection, such as a supply tube 204.

In some examples, printing fluid supply assembly 104 may supply one type of printing fluid to the printheads 106. In some other examples, printing fluid supply assembly 104 may supply a number of types of printing fluid to the printheads 106. For example, printing fluid supply assembly 104 may supply one printing fluid for each primary color to the printheads 106. In some examples, these multiple printing fluids are supplied to the printheads 106 through multiple interface connections, such as multiple supply tubes 204. For example, there may be one supply tube for each type of printing fluid, e. g. for each primary color.

In some examples, printing fluid supply assembly 104 may supply, e. g. four types of printing fluid corresponding to four primary colors to be printed through four supply tubes 204 to printheads 106. In some examples, the printing fluids may be supplied directly to the nozzles 108 of the printheads 106. In some other examples, the printheads 106 may comprise a printing fluid reservoir and the printing fluids may be supplied to such a printing fluid reservoir (not shown) of a printhead 106.

FIG. 3 schematically illustrates an example scanning device 112, such as, e. g. a sensor 300. In some examples, the sensor 300 may comprise a housing 302 that contains or supports one or more light sources 306 and one or more photodetectors 304. For example, the housing 302 may contain or support four light sources 306 and two photodetectors 304. In some examples, the number of light sources may be fewer than four, e.g. three, two or only one light source 306. In some other examples, the number of light sources may be larger than four, e.g. six or eight or even tens of light sources 306 may be provided. In some examples, the photodetectors 304 may be replaced by other sensing elements that are able to provide spectrometric or colorimetric data.

In some other examples, the light sources 306 may be configured to selectively and independently emit visible light toward print media when the media passes the sensor 300. In some examples, each light source 306 may comprise a light-emitting diode (LED) that emits a different color. For example, each light source 306 may comprise a light-emitting diode (LED) that emits one of the different primary colors. In some examples, the colors may include, for example, blue, green, orange, and red.

In some examples, the scanning device 112 may comprise one or more spectrometers, such as, e. g., spectrophotometers. In some examples, the scanning device 112 may comprise one or more colorimeters. In some examples, the scanning device 112 may comprise one or more scanners or sensors. In some examples, the scanning device 112 may comprise one or more cameras, such as CCD cameras, e.g. a line sensor type CCD camera, an area sensor type CCD camera, or the like.

In some examples, the light emitted by the light sources 306 is directed toward the print media 114 and is reflected by the print media 114 to the photodetectors 304. In some examples, the sensor 300 may, for example, further include a lens system (not shown), that focuses the reflected light onto the photodetectors 304. In some examples, the photodetectors 304 are configured to detect the intensity of the light reflected by the print media 114. In some examples, each photodetector 304 measures a different aspect of light intensity. For example, one photodetector 304 may measure diffuse reflectance and the other photodetector 304 may measure spectral reflectance. In some examples, some or each photodetector 304 may comprise a phototransistor. In some examples, a filter (not shown) can be provided between the lens system and the photodetectors 304 to filter out light radiation that may interfere with detection of light reflected by the print media 114.

Figure 4:
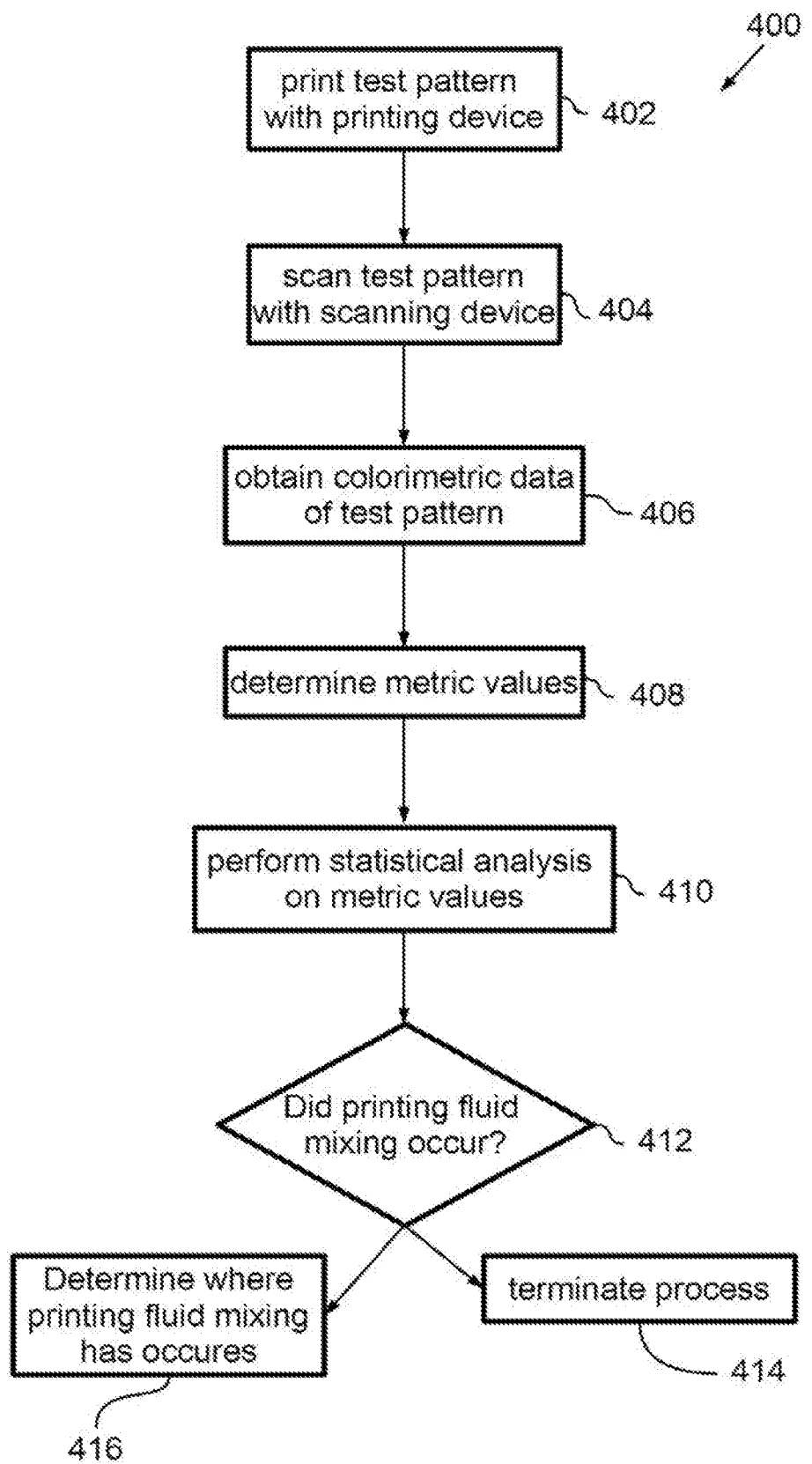
FIG. 4 is a block diagram of an example method of printing fluid mixing detection according to an example.

An example method 400 for detecting printing fluid mixing in a printing device is depicted in FIG. 4. It is to be understood that the method 400 shown in FIG. 4 will be discussed in detail herein, and in some instances, FIGS. 5 through 7 will be discussed in conjunction with FIG. 4.

Figure 5:
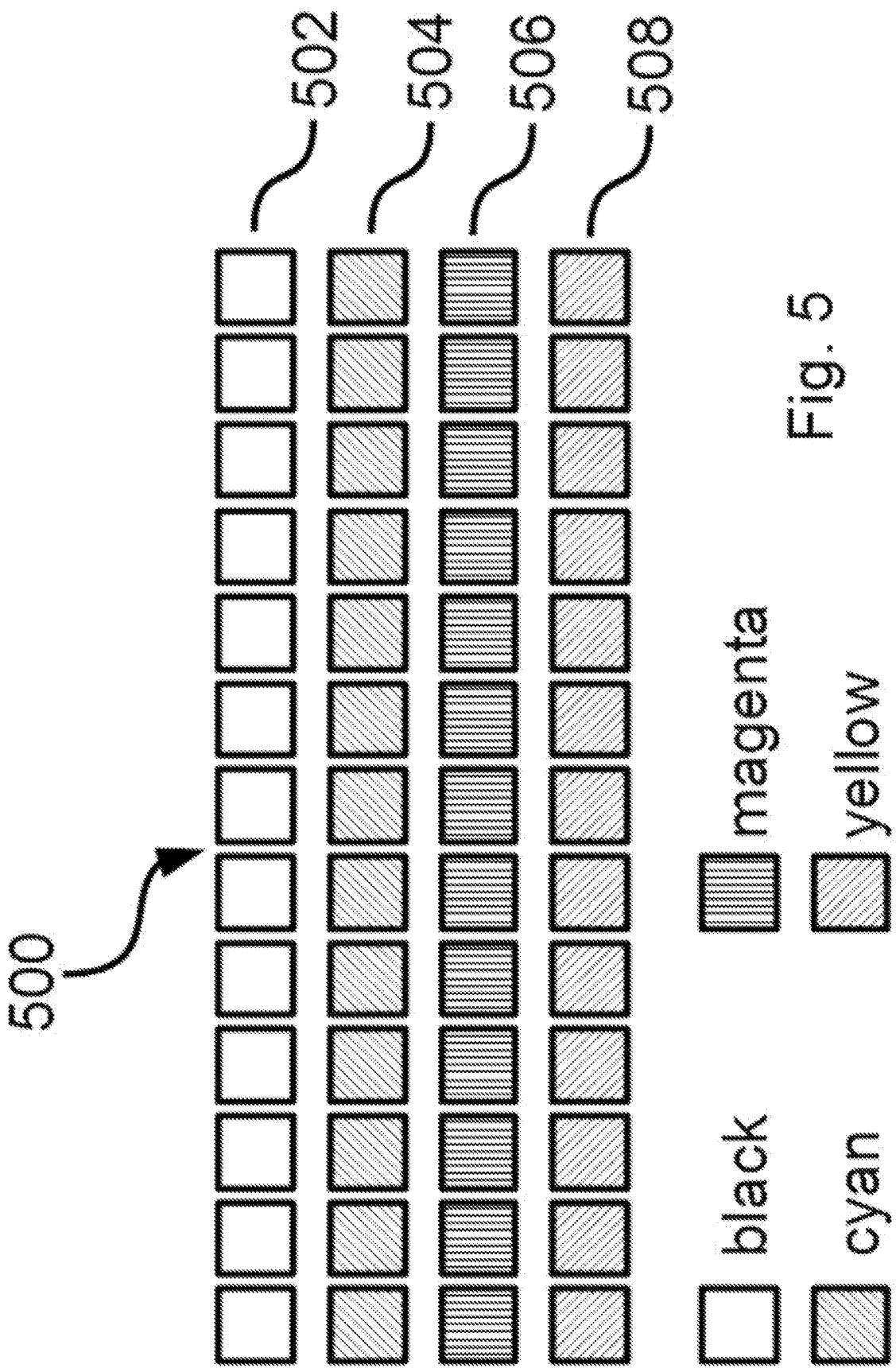
FIG. 5 illustrates an example test pattern for each primary color according to an example.

Referring to FIG. 4, an example method 400 of, detecting printing fluid mixing in a printing device comprises, at box 402, printing a test pattern (cf. FIG. 5). In some examples, the test pattern may consist in one or more test patches for at least one primary color to be printed. For example, the test pattern may consist in one or more test patches for each primary color to be printed. In some examples, the test pattern may consist in one or more test patches for a combination of a plurality of primary colors to be printed. For example, the test pattern may consist in a combination of all primary colors to be printed. For example, for a multicolor inkjet printer may have multiple different printing fluids, e.g. four different printing fluids corresponding to four primary colors, for example black, cyan, magenta and yellow. The test pattern may then consist of a row of test patches for each primary color, which rows may cover the full printing width (cf. FIGS. 5, 6). In some other examples, the test pattern may then consist of one row of test patches for a combination of the four different primary colors.

In some examples, the test patches may cover the full printing width. In some examples, the test patches may cover only part of the full printing width, such as, e.g. half the printing width or the like. In some examples, the density of the test pattern may be selected to maximize the visibility of defects caused by printing fluid mixing. In some examples, there may be variable performance of the printing along the printing width. This may affect dot size, dot shape or dot position, or a combination thereof. In some examples, this may result in variable coverage of printing fluid and variability of lightness or brightness along the printing width.

Referring to FIG. 4, the example method 400 comprises, at box 404, scanning the test pattern with a scanning device 112, such as, e.g. the sensor 300. In some examples, the scanning device may be mounted on a carrier which allows the scanning device to move back and forth along the printing width. For example, the sensor 300 may be moved back and forth along the rows of test patches.

In some examples, one or more light sources are arranged on or adjacent to the scanning device 112. The light sources may emit light, e.g. visible light, toward the print medium 114 on which the test pattern is printed. In some examples, the light emitted by the light sources is reflected by the print medium 114. For example, the light sources may emit visible light toward the test pattern printed on the print medium 114. In some examples, a plurality of light sources may emit light of different colors toward the test pattern. The light may then be reflected by the test patches which are printed on the print medium. The sensor 300 may then detect the reflected light from the test patches on the print medium 114. For example, the reflected light may be detected by photodetectors, by a CCD camera, or the like.

In some examples, the scanning device 112, e.g. the sensor 300, may be calibrated or adjusted prior to scanning a test pattern. For example, the scanning device may be calibrated at the factory at which the scanning device was built prior to shipment of the device. Alternatively, the scanning device may be calibrated automatically or by a user when the device is put into operation.

In some examples, the scanning device 112, e.g. the sensor 300, may be calibrated or adjusted simultaneously with the process of detecting printing fluid mixing.

Irrespective of where the scanning device is calibrated, the calibration process may comprise an off-line training process to establish expected metric values, such as, e.g. CIE L*a*b* values, hue angles for given printing fluids or the like. In some examples, the calibration process comprises scanning a test patch for one or more printing fluids corresponding to one or more primary colors used by the printing device. For example, the calibration process may comprise scanning a test patch of each primary color of printing fluid used by the printing device.

In some examples, the calibration process may further comprise scanning test patches of primary colors at different coverages. For example, the scanning process may comprise scanning a number of test patches for each primary color at a number of different coverages, e.g. at 20%, 40%, 60%, 80% and 100%. In some examples, expected colorimetric data for the primary colors of printing fluid used by the printing device may be obtained.

In some examples, test patches of each primary color may be scanned under controlled conditions and the respective metric values, such as, e.g. CIE Lab values, hue angles or the like, may be determined in order to determine the expected metric values without contamination. Of course, Lab values or hue angles are only one example domain to discriminate for unwanted changes due to printing fluid mixing. Other domains, such as, for example, the native Tetris domain of ROGB readings or native scanner RGB values or the like may also be employed.

In some examples, single printing fluid ramps may be measured with respective devices and tolerances may be established. For example, a pure yellow ramp may have a specific behavior in Tetris ROGB, e.g. R/O/G/B ratios, or in scanner RGB terms while contamination of the ramps due to the presence of other printing fluids may result in changes in ROGB or RGB values. These changes may be established off-line in a similar way as the calibration process described above.

In some examples, the light emitted by the light sources may be focused by an optical system, such as a lens system. In some examples, the reflected light may be focused by, e.g. a lens system, before it is detected by, e.g. the photodetectors.

Referring to FIG. 4, the example method 400 comprises, at box 406, obtaining colorimetric data of the test pattern. Here, calorimetric data refers to any kind of spectrometric or calorimetric data or intensity information. In some examples, the colorimetric data may be obtained by the sensor 300. In some other examples, the calorimetric data may be determined by the controller 110 from the measurement values provided by the sensor 300.

In some examples, the scanning device may comprise any of a spectrometer, a spectrophotometer, a calorimeter, a scanner or a camera, e.g. a CCD camera, to provide colorimetric data.

In some examples, sensor 300 may measure the light intensity or different aspects of light intensity. In some examples, sensor 300 may measure diffuse reflectance, spectral reflectance or a combination of both.

In some examples, the colorimetric data may comprise any of International Commission of Illumination or Commission Internationale de l'Eclaire (CIE) L*a*b* values, CIE XYZ values, CIE LCh values, HSL values, HSV values, RGB values, CMYK values or any combination thereof.

In some examples, the calorimetric data may be obtained over the full width of the test pattern. For example, the test pattern may comprise a number of test patches which cover the full printing width. In this case, colorimetric data may be obtained for each test patch, resulting in a number of calorimetric data corresponding to the full printing width.

In some examples, the printing device may be a page-wide array printer. In this case, the test pattern may be printed simultaneously by the array of printheads. For example, the dies of the printheads may cover the full printing width. By depositing printing fluid on the print medium from each die simultaneously, a test pattern covering the full printing width may be printed. Each test patch of the test pattern may then correspond to a particular die of a particular printhead of the array of printheads.

Referring to FIG. 4, the example method 400 comprises, at box 408, determining metric values from the colorimetric data obtained at box 406. In some examples, the metric values may be determined by the scanning device itself. In some other examples, the metric values may be determined by the controller 110 from the calorimetric data.

In some examples, metric values comprise any of hue angle, lightness, brightness, intensity or chroma or any combination thereof. For example, the hue angle may be determined from CIE L*a*b* values as $h_{ab}=\text{atan } 2(a^*,b^*)$ In some examples, the metric values are determined based on a characterization of printing fluid ramps, e.g. on the slope of the printing fluid ramps.

Referring to FIG. 4, the example method 400 comprises, at box 410, performing a statistical analysis on the metric values determined at box 408. In some examples, the statistical analysis determines single metric values which deviate from the mean or the median of the metric values determined at box 408. For example, metric values, such as, e.g. a* and b*, may be determined for each test patch of a test pattern. In this case, a mean or a median of a* and b* may be determined. Outliers may then be identified by determining the a*, b* values which deviate from the mean. In some examples, a metric value is identified as an outlier when it deviates from the mean by at least a certain fraction of a standard deviation, e.g. half a standard deviation or two thirds of a standard deviation or the like. In some examples, a metric value is identified as an outlier when it deviates from the mean by one or more standard deviations, e.g. one standard deviation, two standard deviations or the like. In some examples, a metric value is identified as an outlier when it deviates from the mean by at least a certain multiple of a standard deviation, e.g. 1.4 standard deviations, 1.5 standard deviations or the like.

In some examples, the hue angle may be determined for each test patch of a test pattern. In this case, a mean or a median of the hue angles may be determined and outliers may be identified by identifying those single hue angles which deviate from the mean or the median by a certain amount, e.g. by a number of standard deviations or the like.

In some examples, the statistical analysis determines metric values, such as hue angles or a*, b* values, which deviate from a first quartile or a third quartile or the like by a predetermined number of standard deviations, e.g. one standard deviation.

In some examples, the obtained colorimetric data and/or the metric values may be biased. For example, the lightness may be biased due to some characteristics of the printing device, the print medium, or both. By applying a statistical analysis on the metric values, such a bias may be taken into account and compensated.

Referring to FIG. 4, the example method 400 comprises, at box 412, determining, based on the statistical analysis performed at box 410, whether printing fluid mixing has occurred or not. Printing fluid mixing may occur when multiple printing fluids, e. g. corresponding to different primary colors, are used in a printing device. For example, barriers or other components within a printhead that segregate the various printing fluids from one another may become compromised, allowing one printing fluid corresponding to one primary color, e.g. cyan to mix with another printing fluid corresponding to another primary color, e.g. magenta. In this case, the nozzles of this printhead which are determined to deposit printing fluid corresponding to, for example, magenta on the print medium may deposit a composition of two printing fluids corresponding to, for example, cyan and magenta on the print medium This may result in a deviation of the printed color from the primary color which was supposed to be printed. For example, the test patch may have been intended to be magenta, but may appear more bluish due to printing fluid mixing.

In some examples, different printing fluids ejected from different nozzles may mix on the outer surface of the printhead. For example, one or more first nozzles may eject a printing fluid corresponding to a first primary color, e.g. magenta, while one or more second nozzles, which may be adjacent to the first nozzles, may eject a printing fluid corresponding to a second primary color, e.g. cyan. In this case, the printing fluids corresponding to, e.g. magenta and cyan, respectively, may mix on the outer surface of the printhead before being deposited on the print medium. Such a condition may occur, for example, due to a printhead wiping procedure performed by the printing device. This may also result in a deviation of the printed color from the primary color which was supposed to be printed or in color defects in the printed image.

Irrespective of which kind of printing fluid mixing occurs, the quality of the printed images may suffer given that the printing fluid that the printhead deposits on the print medium is not the printing fluid which is intended to be deposited on the print medium. This may result in a deviation of color, intensity or any other kind of colorimetric characteristic in the images printed by the printhead for which printing fluid mixing has occurred.

When the statistical analysis performed at box 410 provides no significant outliers, it may be determined that no printing fluid mixing has occurred. However, when the statistical analysis performed at box 410 provides one or more outliers, i.e. if there are one or more test patches for which the colorimetric data deviates significantly from the remaining colorimetric data, it may be determined that printing fluid mixing has occurred. Thus, by statistically analyzing the metric values it can be determined whether printing fluid mixing has occurred or not.

In case that, after the metric values have been statistically analyzed, the determination at box 412 concludes that no printing fluid mixing has occurred, the example method 400 terminates, as illustrated at box 414 in FIG. 4.

In case that, after the metric values have been statistically analyzed, the determination at box 412 concludes that printing fluid mixing has occurred, the example method 400 as shown in FIG. 4 comprises, at box 416, determining, based on the statistical analysis performed at box 410, where the printing fluid mixing has occurred.

As schematically showed in FIG. 2c, in some examples, each die 202 may be supplied with multiple printing fluids separately by the printing fluid supply assembly 104. For example, each die 202 of each printhead 106 may be supplied with one printing fluid for each primary color by the printing fluid supply assembly 104 through a supply tube 204. As, in some examples, printing fluid mixing may occur within a printhead 106 or on the outer surface of a printhead 106, it may affect only one die 202. In some examples, printing fluid mixing may affect more than one die, e.g. two dies or three dies. For example, printing fluid mixing may affect a number of dies 202 which are arranged adjacent to one another.

In some examples, the test pattern comprises a number of test patches and each die 202 may have deposited the printing fluid for a particular test patch on the print medium 114. Thus, in some examples, each test patch may correspond to one die 202. In some other examples, a test patch may be printed by depositing printing fluid from a number of adjacent dies 202 on the print medium 114. For example, a test patch may be printed by depositing printing fluid from two dies 202 which are arranged adjacent to each other or which may even at least partly overlap. In some other examples, a die 202 of a printhead 106 may deposit printing fluid on the print medium to print more than one test patch, e.g. two or three test patches. For example, one die 202 may print two or three test patches which are arranged adjacent to one another on the print medium 114 by depositing printing fluid on the print medium 114.

In some examples, by statistically analyzing the metric values and identifying outliers therein, it may be determined which die 202 or which number of dies 202 may correspond to the test patches which have metric values that deviate significantly from the remaining metric values, e.g. which are identified as outliers at box 410. Thus, in some examples it may be determined at which printhead 106 the printing fluid mixing has occurred. In some examples, it may be determined at which die 202 or at which number of dies 202 of a printhead 106 printing fluid mixing has occurred.

In some examples, a warning signal may be displayed in the case that printing fluid mixing has occurred and has been detected as described above. For example, there may be a light source, such as a signal lamp, provided at the printing device which signals a user that printing fluid mixing has occurred. In some examples, there may be a display on which a warning message may be displayed in case that printing fluid mixing has been detected.

In some examples, recovery actions may be applied to the printing device in the case that printing fluid mixing has occurred and has been detected as described above. In some examples, the recovery actions may be applied automatically when printing fluid mixing has been detected. In other examples, recovery actions may be applied by a user or after a user has acknowledged that printing fluid mixing has occurred and has been detected.

In some examples, recovery actions may comprise selectively spitting printing fluid through the nozzles of the dies for which printing fluid mixing has been detected. In some examples, recover actions may comprise wiping the outer surface of the printhead at the dies for which printing fluid mixing has been detected. In one examples, recover actions may comprise priming printing fluid at the nozzles of the dies for which printing fluid mixing has been detected. In some examples, recover actions may comprise a combination of the above.

In FIG. 5, an example test pattern 500 for each primary color is illustrated. The example test pattern according to FIG. 5 comprises a number of rows 502, 504, 506, 508, e.g. four rows, of test patches, corresponding to a number of primary colors, for example four primary colors. In some examples, as indicated in. FIG. 5, the printing device may use four different primary colors for printing, e.g. black, cyan, magenta and yellow.

In some examples, a row of test patches is printed for each primary color. In some other examples, a row of test patches is printed for a combination of the primary colors. For example, test pattern 500 may comprise only one row of test patches, and each test patch may be printed using a combination of the primary colors, e.g. a combination of black, cyan, magenta and yellow. In some examples, each test patch may be printed using a combination of some of the primary colors, e.g. of two or three primary colors. For example, test pattern 500 may comprise only one row of test patches, and each test patch may be printed using a combination of three primary colors, e.g. a combination of cyan, magenta and yellow.

In some examples, the rows 502, 504, 506, 508 may span the full printing width. In some other examples, the rows 502, 504, 506, 508 may span only a fraction of the printing width, e.g. half the printing width or a quarter of the printing width or the like.

In some examples, the test pattern 500 may comprise one or more continuous rows which may be printed for each primary color separately or for a combination of some or all primary colors. For example, the rows 502, 504, 506, 508 may not be comprised of a number of test patches. In some examples, the test pattern may comprise a pattern of dots, shapes or the like.

Figure 6:
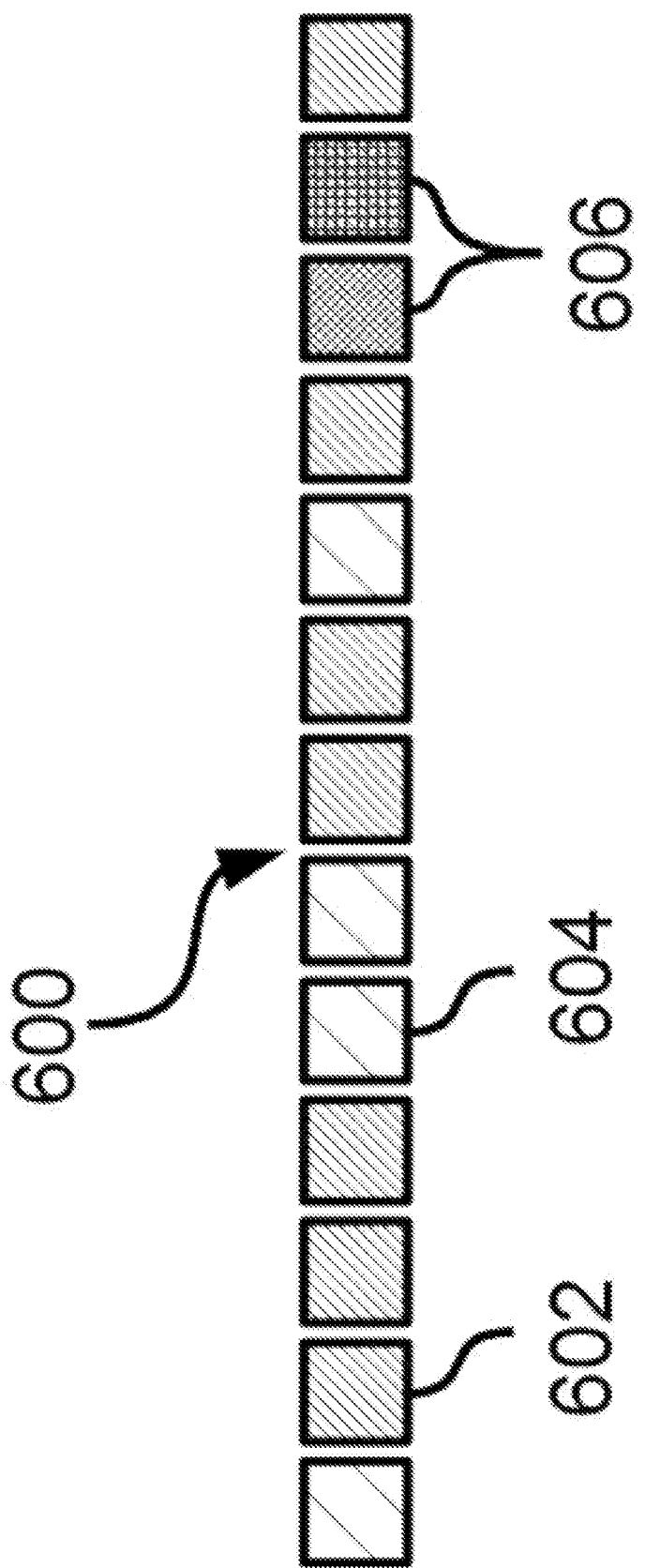
FIG. 6 illustrates an example test pattern for one primary color having printing fluid saturation differences and printing fluid mixing according to an example.

Referring to FIG. 6, one example row 600 of an example test pattern 500 is shown. In some examples, the row 600 may comprise a number of test patches 602, 604, 606. In some examples, the row 600 may span the full printing width. In some examples, each test pattern 602, 604, 606 of row 600 may correspond to one die 202 of a printhead 106. For example, row 600 may be a page-wide row of an example test pattern 500 which comprises a number of test patches 602, 604, 606. The test patches 602, 604, 606 may be printed by depositing a first printing fluid corresponding to a first primary color, e.g. magenta, on the print medium. Each test patch 602, 604, 606 may correspond to a particular die 202 of a printhead 106.

As indicated in FIG. 6, different dies 202 may show different saturation of printing fluid caused by, e.g. dot size, dot shape or dot position variability or a combination thereof. In this case, lightness of the corresponding test patches may vary along the row 600 of test patches 602, 604, 606. For example, test patch 602 shows a larger printing fluid saturation than test patch 604. Moreover, as indicated in FIG. 6, different dies 202 may show contamination of the first printing fluid with a second printing fluid caused by, e.g. printing fluid mixing. For example, test patches 606 show a contamination of the printing fluid of the first primary color, e.g. magenta, with a printing fluid of a second primary color, e.g. cyan.

In some examples, row 600 of the test pattern 500 may be scanned by the scanning device 112, e.g. by a sensor 300, and colorimetric data corresponding to the test patches 602, 604, 606 may be determined. As explained with reference to FIG. 4, box 408, in some examples, metric values, such as, e.g. CIE L*a*b* values, may then be determined from that colorimetric data. An examples of such metric values corresponding to the test patches of row 600 as illustrated in FIG. 6 is summarized in Table 1.

TABLE 1 obtained a* and b* values and hue angle $h_{ab}$ for the test patches of row 600 illustrated in FIG. 6.

| patch no. | a* | b* | $h_{ab}$ |
|---|---|---|---|
| | 41.52 | −29.21 | −0.61 |
| 602 | 67.74 | −45.60 | −0.59 |
| | 60.88 | −40.73 | −0.59 |
| | 68.63 | −44.78 | −0.58 |
| 604 | 24.69 | −18.09 | −0.63 |
| | 26.46 | −18.71 | −0.61 |
| | 61.00 | −40.47 | −0.58 |
| | 67.11 | −46.63 | −0.61 |
| | 31.28 | −22.78 | −0.63 |
| 606 | 65.74 | −43.98 | −0.59 |
| 606 | 20.62 | −30.29 | −0.97 |
| | 9.01 | −23.21 | −1.16 |
| | 50.00 | −36.95 | −0.64 |

Figure 7:
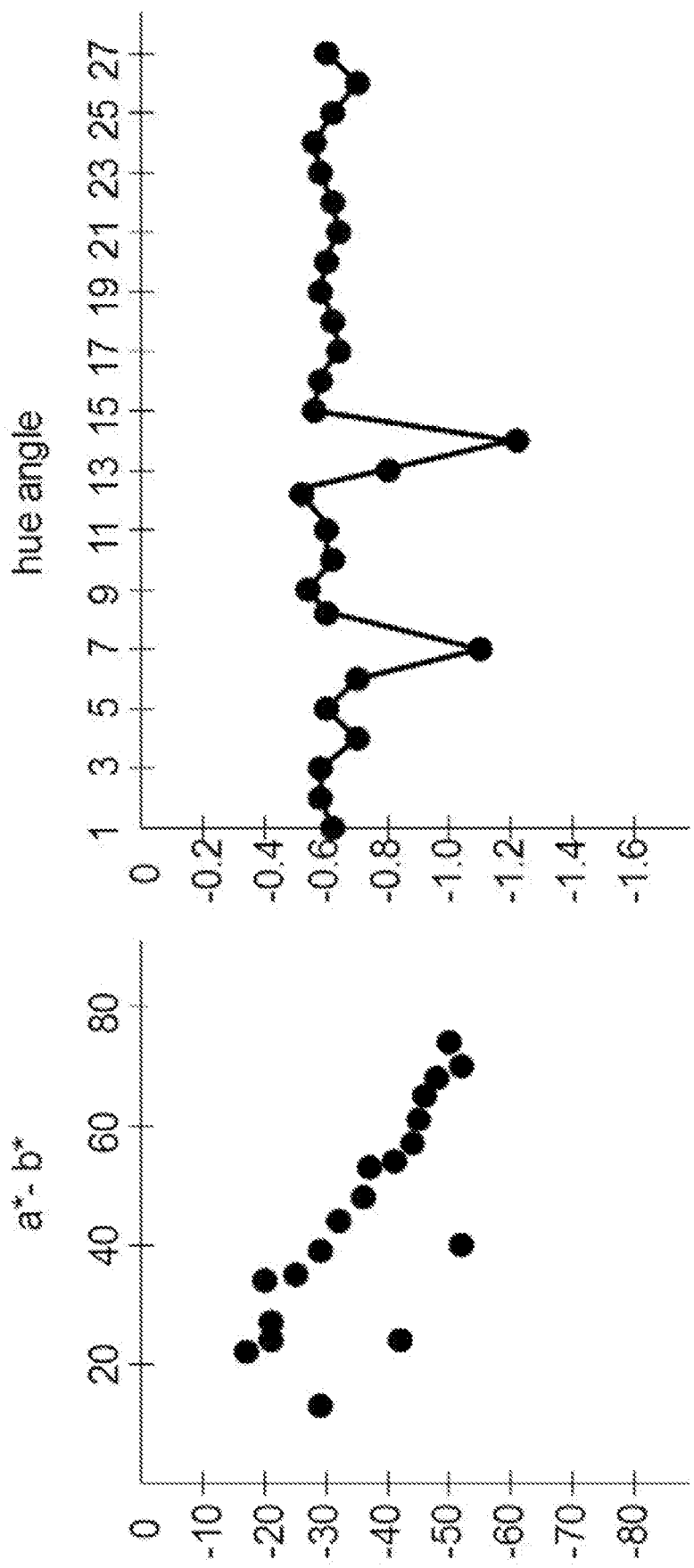
FIG. 7 illustrates an example statistical analysis chart showing outliers due to printing fluid mixing according to an example.

FIG. 7 illustrates two example charts showing the determined a*-b* values in a diagram (left) and the determined corresponding hue angle $h_{ab}$ (right) for an example test row. The test row may be similar to the test row shown in FIG. 6. In both diagrams of FIG. 7, outliers due to printing fluid mixing are shown.

In some examples, as is illustrated in the a*-b* diagram of FIG. 7 (left), all but a few, e.g. three measured and determined a*-b* values lie essentially on a straight line. The particular a*-b* values that deviate significantly from that line are determined as outliers and indicate that printing fluid mixing may have occurred in the corresponding dies 202.

In some examples, as is illustrated in the hue angle diagram of FIG. 7 (right), the measured and determined hue angle $h_{ab}$ is essentially constant over the full range of the test pattern row. In some examples, a few, e.g. three hue angle values may deviate from the remaining hue angle values significantly and may be identified as outliers. These outliers indicate that printing fluid mixing ray have occurred in the corresponding dies 202.

Figure 8:
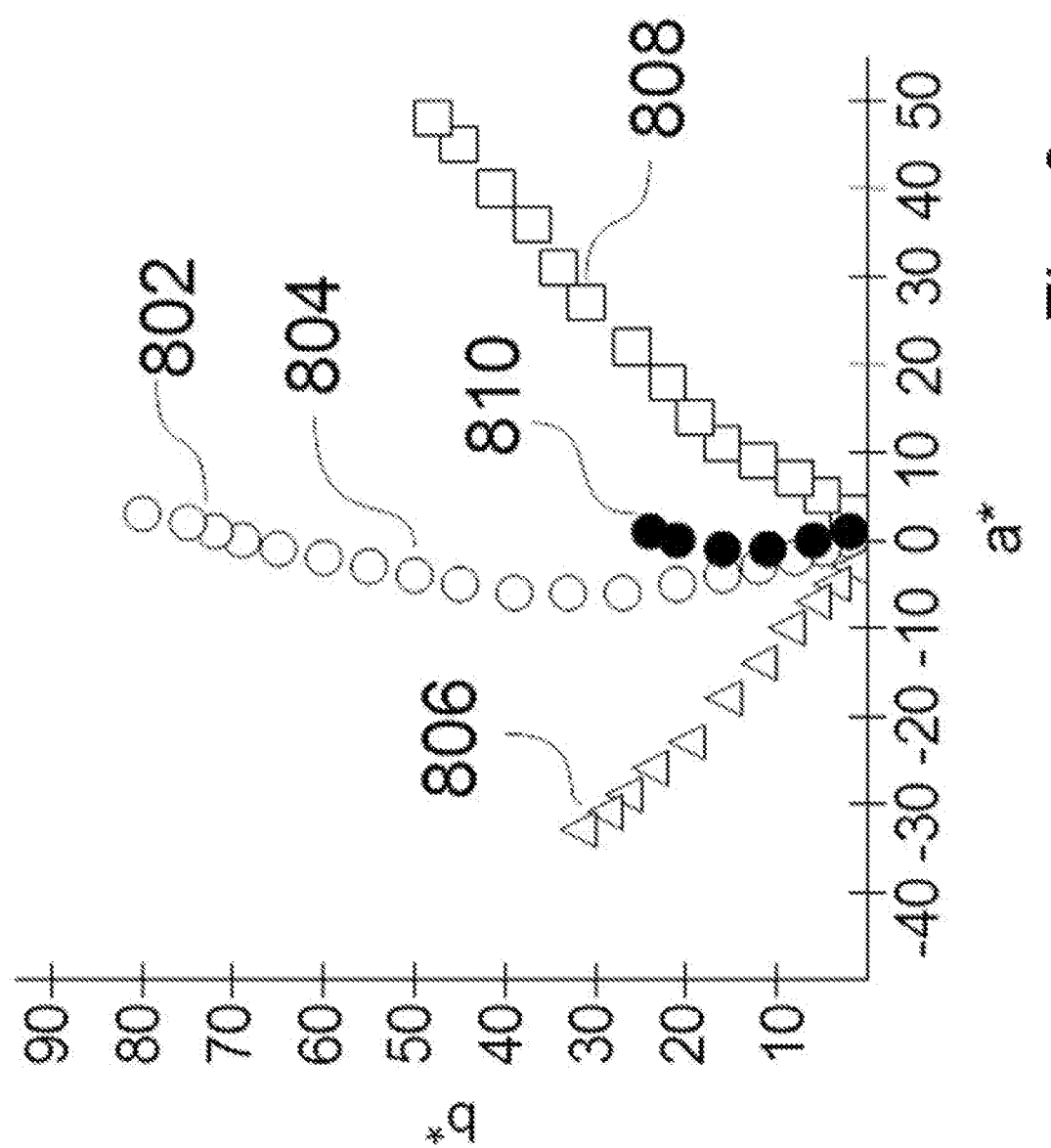
FIG. 8 is a two-dimensional chart illustrating the expected behavior in case of printing fluid mixing for three primary according to an example.

FIG. 8 illustrates an a*-b* diagram in which an example of printing fluid ramps is shown. In some examples, the printing fluid ramp for one primary color may be determined. In some examples, the printing fluid ramps for a number of primary colors may be determined. For example, the printing fluid ramps for all primary colors may be determined.

In the example illustrated in FIG. 8, the printing fluid ramp for a primary color, e.g. yellow, is determined. A printing fluid ramp corresponds to a row of test patches that have been printed with increasing intensity or density. The corresponding a*-b* values may then be plotted in an a*-b* diagram such as the diagram illustrated in FIG. 8. As indicated, the corresponding data points essentially lie on a line having a slope that corresponds to a particular primary color, i.e. to a particular printing fluid.

For example, a yellow ramp may comprise a number of test patches printed with the printing fluid corresponding to the primary color yellow with increasing density, starting from, e.g. 10% up to, e.g. 100%. Those test patches which are printed with high density of almost pure yellow lie within the so-called "pure zone" 802, while test patches with only about half the maximum density, i.e. having a density of about 50%, lie within the "mid-point zone" 804. In some examples, the pure zone 802 indicates the region where color variation may be acceptable and would not be detected as printing fluid mixing, while test patches which lie significantly outside this zone would be considered as contaminated, i.e. printing fluid mixing would be detected.

In some examples, the slopes of these ramps are determined and analyzed. For example, when printing fluid mixing occurs, the slope of the printing fluid ramp corresponds to the contaminated printing fluid may change. For example, as indicated in FIG. 8, when the printing fluid corresponding to yellow is contaminated with the printing fluid corresponding to magenta, the slope of the contaminated yellow ramp 808 may be shifted toward the right hand side in the diagram of FIG. 8. When, on the other hand, the print ng fluid corresponding to yellow is contaminated with the printing fluid corresponding to cyan, the slope of the contaminated yellow ramp 806 may be shifted toward the left hand side in the diagram of FIG. 8. Thus, by analyzing the slopes of the printing fluid ramps, it may be determined if printing fluid mixing has occurred and it may be determined which printing fluid has been contaminated with which other printing fluid.

In some examples, the diagram of FIG. 8 may be extended to a three-dimensional diagram, taking into account variations in lightness. For example, when a printing fluid corresponding to a primary color such as, e.g. yellow, as shown in FIG. 8, is contaminated with the printing fluid corresponding to the primary color black, the lightness of the test patches printed with the contaminated printing fluid may change. Such a change in lightness may result in a change of the slope of the printing fluid ramp 810 in a three-dimensional diagram including an axis corresponding to lightness. This is indicated by a black-yellow ramp 810 in FIG. 8 which is to be considered to be inclined along a third axis (not shown) in the diagram illustrated in FIG. 8. In the case of black contamination of another primary color, in some examples, chroma may be the metric value that is determined and analyzed instead of L*a*b* values or hue angles.

Figure 9:
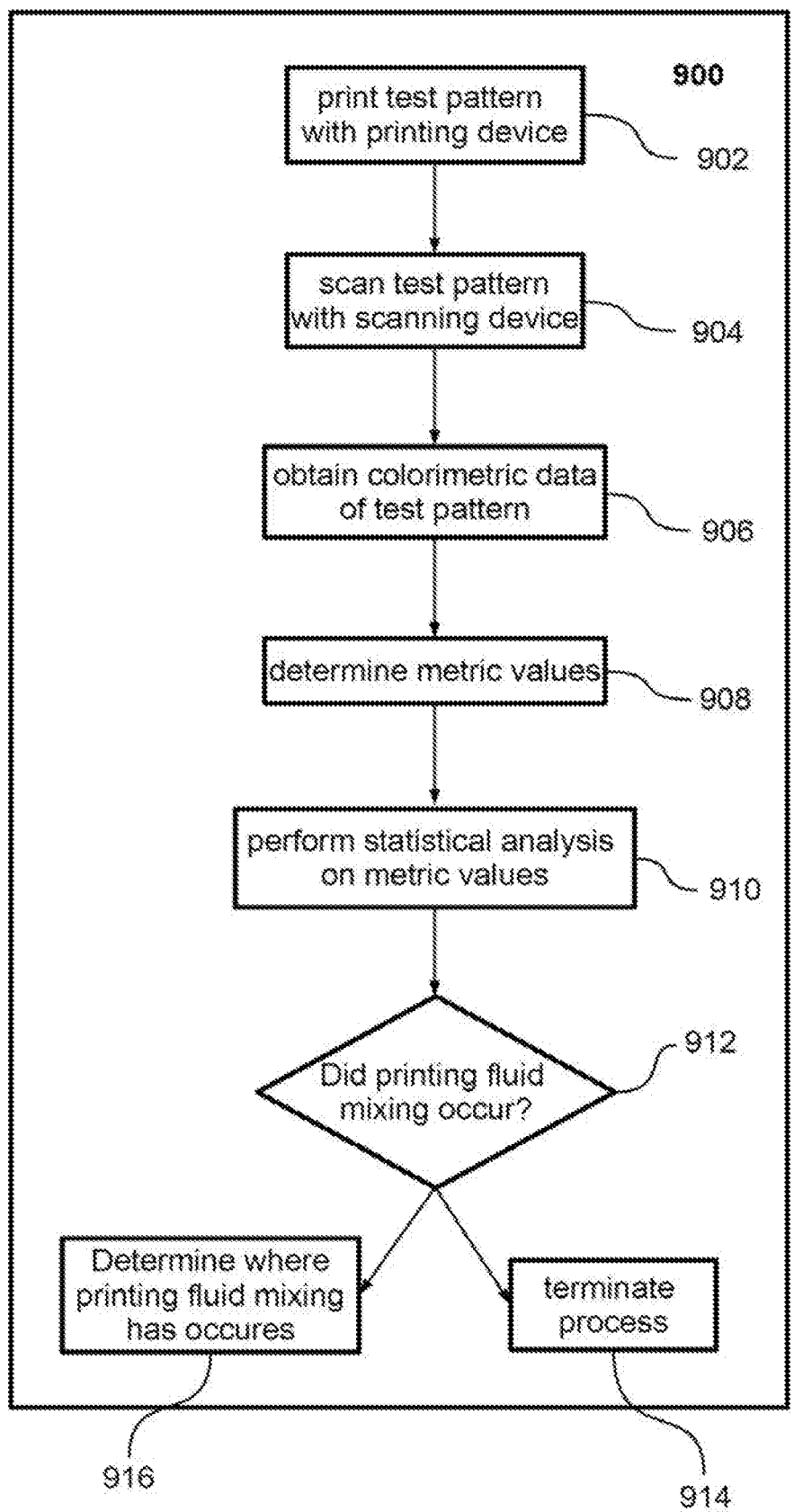
FIG. 9 illustrates an example of a non-transitory computer readable medium encoded with instructions according to an example.

FIG. 9 illustrates a non-transitory computer readable medium 900. The medium 900 may be, any kind of non-transitory computer readable medium, such as, e.g. a CD-ROM or the like. In some examples, the medium 900 may be encoded with instructions 902, 904, 906, 908, 910, 912, 914 and 916. In some examples, the instructions may be executable by, e.g. a processor, for example a computer processor. In some examples, the instructions 902, 904, 906, 908, 910, 912, 914 and 916 may, when executed by a processor, cause the processor to perform method of detecting printing fluid mixing.

In some examples, the medium 900 may be encoded with instructions 902 that, when executed by a processor, cause the processor to print a test pattern for at least one printing fluid with a printing device.

In some examples, the medium 900 may be encoded with instructions 904 that, when executed by a processor, cause the processor to scan the test pattern for the at least one printing fluid with a scanning device.

In some examples, the medium 900 may be encoded with instructions 906 that, when executed by a processor, cause the processor to obtain colorimetric data of the test pattern for the at least one printing fluid.

In some examples, the medium 900 may be encoded with instructions 908 that, when executed by a processor, cause the processor to determine metric values from the colorimetric data.

In some examples, the medium 900 may be encoded with instructions 910 that, when executed by a processor, cause the processor to performing a statistical analysis on the determined metric values.

In some examples, the medium 900 may be encoded with instructions 912 that, when executed by a processor, cause the processor to determine, based on the statistical analysis, whether printing fluid mixing has occurred.

In the exemplary case that printing fluid mixing has not occurred, the medium 900 may be encoded with instructions 914 that, when executed by a processor, cause the processor to terminate the process. Otherwise, in the exemplary case that printing fluid mixing has occurred, the medium 900 may be encoded with instructions 916 that, when executed by a processor, cause the processor to determine, based on the statistical analysis, where printing fluid mixing has occurred.

In some examples, a non-transitory computer readable medium encoded with instructions is provided, that, when executed by a processor, cause the processor to perform a method of detecting printing fluid mixing, wherein the test pattern is printed for each primary color of printing fluid used by the printing device or for a combination of each primary color of printing fluid used by the printing device.

In some examples, the non-transitory computer readable medium is further encoded with instructions, that, when executed by a processor, cause the processor to print the test pattern for the entire width of a printhead or a printbar of the printing device. In some examples, the printing device may be a page wide array printing device.

In some examples, the non-transitory computer readable medium is further encoded with instructions, that, when executed by a processor, cause the processor to scan the test pattern with a scanning device that includes at least one of a spectrophotometer, a calorimeter, a scanner and a camera.

In some examples, the non-transitory computer readable medium is further encoded with instructions, that, when executed by a processor, cause the processor to separately illuminate the test pattern with at least one light source.

In some examples, the non-transitory computer readable medium is further encoded with instructions, that, when executed by a processor. cause the processor to illuminate the test pattern with a plurality of light sources of different colors.

In some examples, the non-transitory computer readable medium is further encoded with instructions, that, when executed by a processor, cause the processor to calibrate the scanning device by scanning a patch of each primary color of printing fluid used by the printing device at different coverages to obtain expected calorimetric data for said primary colors of printing fluid used by the printing device.

In some examples, the non-transitory computer readable medium is further encoded with instructions, that, when executed by a processor, cause the processor to obtain colorimetric data of the test pattern for the at least one printing fluid, wherein the colorimetric data comprises at least one of CIE L*a*b* values, CIE XYZ values, CIE LCh values, HSL values, HSV values, RGB values and CMYK values.

In some examples, the medium is further encoded with instructions that, when executed by a processor, cause the processor to determine metric values from the colorimetric data, wherein the metric values comprise at least one of hue angle, lightness, intensity and chrome, or wherein the metric values are based on a characterization of printing fluid ramps.

In some examples, the medium is further encoded with instructions that, when executed by a processor, cause the processor to determine metric values which deviate from one of the mean, the median, the first quartile, the second quartile and the third quartile by a predetermined number of standard deviations.

In some examples, the medium is further encoded with instructions that, when executed by a processor, cause the processor to applying recovery actions to the printing device in the case that printing fluid mixing has occurred.

In some examples, the medium is further encoded with instructions that, when executed by a processor, cause the processor to display a warning signal in the case that printing fluid mixing has occurred.

What is claimed is:

1. A method of detecting printing fluid mixing contamination comprising:
   printing a test pattern for at least one printing fluid with a printing device;
   scanning the test pattern for the at least one printing fluid with a scanning device;
   obtaining colorimetric data of the test pattern for the at least one printing fluid;
   determining metric values from the colorimetric data;
   performing a statistical analysis on the determined metric values in relation to metric values without printing fluid mixing contamination;
   determining, based on the statistical analysis, whether any printing fluid mixing contamination has occurred; and
   determining, based on the statistical analysis, where any printing fluid mixing contamination has occurred.

2. The method of claim 1, wherein the test pattern is printed for each primary color of printing fluid used by the printing device.

3. The method of claim 1, wherein the test pattern is printed for the entire width of a printhead or a printbar of the printing device.

4. The method of claim 3, wherein the printing device is a page wide array printing device.

5. The method of claim 1, wherein the scanning device includes at least one of a spectrophotometer, a colorimeter, a scanner and a camera.

6. The method of claim 1, wherein scanning the test pattern comprises separately illuminating the test pattern with at least one light source.

7. The method of claim 6, wherein the test pattern is illuminated with a plurality of light sources of different colors.

8. The method of claim 1, wherein the scanning device is calibrated by scanning a patch of each primary color of printing fluid used by the printing device at different coverages to obtain expected colorimetric data for said primary colors of printing fluid used by the printing device.

9. The method of claim 1, wherein the colorimetric data comprises at least one of CIE L*a*b* values, CIE XYZ values, CIE LCh values, HSL values, HSV values, RGB values and CMYK values.

10. The method of claim 1, wherein the metric values comprise at least one of hue angle, lightness, intensity and chroma, or wherein the metric values are based on a characterization of printing fluid ramps.

11. The method of claim 1, wherein the statistical analysis determines metric values which deviate from one of the mean, the median, the first quartile, the second quartile and the third quartile by a predetermined number of standard deviations.

12. The method of claim 1, further comprising one of:
applying recovery actions to the printing device in the case that printing fluid mixing contamination has occurred, or
displaying a warning signal in the case that printing fluid mixing contamination has occurred.

13. A printing device comprising
a printhead assembly or a printbar including at least one printhead having a printhead die and at least one nozzle,
a scanning device, and
a controller,
wherein the controller is to detect printing fluid mixing contamination of a printhead of the printing device, wherein a test pattern is printed for at least one printing fluid with the printhead, said test pattern is scanned using the scanning device to obtain colorimetric data, metric values are determined from the colorimetric data and a statistical analysis is performed on the metric values in relation to metric values without printing fluid mixing contamination to determine whether any printing fluid mixing contamination has occurred and where any printing fluid mixing contamination has occurred.

14. The printing system of claim 13, wherein the test pattern is printed for each primary color of printing fluid used by the printing device.

15. The non-transitory computer-readable medium of claim 14, wherein the test pattern is printed for each primary color of printing fluid used by the printing device.

16. A non-transitory computer readable medium encoded with instructions that, when executed by a processor, cause the processor to perform processing comprising:
printing a test pattern for at least one printing fluid with a printing device;
scanning the test pattern for the at least one printing fluid with a scanning device;
obtaining colorimetric data of the test pattern for the at least one printing fluid;
determining metric values from the colorimetric data;
performing a statistical analysis on the determined metric values in relation to metric values without printing fluid mixing contamination;
determining, based on the statistical analysis, whether any printing fluid mixing contamination has occurred; and
determining, based on the statistical analysis, where any printing fluid mixing contamination has occurred.

* * * * *